United States Patent
Goel et al.

(10) Patent No.: US 8,417,987 B1
(45) Date of Patent: Apr. 9, 2013

(54) MECHANISM FOR CORRECTING ERRORS BEYOND THE FAULT TOLERANT LEVEL OF A RAID ARRAY IN A STORAGE SYSTEM

(75) Inventors: Atul Goel, Sunnyvale, CA (US); Sunitha Sankar, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 237 days.

(21) Appl. No.: 12/629,032

(22) Filed: Dec. 1, 2009

(51) Int. Cl.
*G06F 11/00* (2006.01)

(52) U.S. Cl.
USPC ............................................. 714/6.1; 714/6.22

(58) Field of Classification Search ............... 714/2, 6.1, 714/6.21, 6.22, 6.23, 6.24, 6.3, 42, 48, 54
See application file for complete search history.

(56) References Cited

U.S. PATENT DOCUMENTS

| | | | |
|---|---|---|---|
| 4,425,615 A | 1/1984 | Swenson et al. | |
| 5,469,453 A * | 11/1995 | Glider et al. | 714/6.12 |
| 5,596,709 A | 1/1997 | Bond et al. | |
| 5,629,950 A | 5/1997 | Godiwala et al. | |
| 5,758,054 A * | 5/1998 | Katz et al. | 714/22 |
| 6,243,827 B1 | 6/2001 | Renner, Jr. | |
| 6,741,561 B1 | 5/2004 | Lee | |
| 7,461,101 B2 | 12/2008 | Hsu et al. | |
| 7,490,263 B2 * | 2/2009 | King | 714/6.13 |
| 7,523,257 B2 | 4/2009 | Horn et al. | |
| 7,793,146 B1 | 9/2010 | Gibson et al. | |
| 7,890,795 B1 | 2/2011 | Madnani et al. | |
| 2003/0233611 A1 | 12/2003 | Humlicek et al. | |
| 2005/0114728 A1 | 5/2005 | Aizawa et al. | |
| 2006/0031708 A1 | 2/2006 | Desai | |
| 2006/0117216 A1 | 6/2006 | Ikeuchi et al. | |
| 2006/0174156 A1 | 8/2006 | Balasubramanian | |
| 2006/0218362 A1 | 9/2006 | McManis | |
| 2006/0282700 A1 | 12/2006 | Cavallo | |
| 2007/0220313 A1 | 9/2007 | Katsuragi et al. | |
| 2008/0010503 A1 | 1/2008 | Cashman | |
| 2008/0256420 A1 | 10/2008 | Hafner et al. | |
| 2009/0037656 A1 | 2/2009 | Suetsugu et al. | |
| 2009/0055682 A1 | 2/2009 | Gibson et al. | |
| 2009/0063898 A1 | 3/2009 | Eisen et al. | |
| 2009/0199042 A1 | 8/2009 | Ishikawa et al. | |
| 2011/0145633 A1 | 6/2011 | Dickens et al. | |

OTHER PUBLICATIONS

Non-Final Office Action in related U.S. Appl. No. 12/772,006 dated Sep. 20, 2011.
Response to Non-Final Office Action in related U.S. Appl. No. 12/772,006 dated Feb. 21, 2012, pp. 1-11.
Final Office Action in related U.S. Appl. No. 12/772,006 dated Sep. 12, 2012, pp. 1-9.

* cited by examiner

*Primary Examiner* — Dieu-Minh Le
(74) *Attorney, Agent, or Firm* — Cooper Legal Group, LLC

(57) ABSTRACT

Embodiments of the present invention provide novel, reliable and efficient technique for tracking, tolerating and correcting unrecoverable errors (i.e., errors that cannot be recovered by the existing RAID protection schemes) in a RAID array by reducing the need to perform drastic recovery actions, such as a file system consistency check, which typically disrupts client access to the storage system. Advantageously, ability to tolerate and correct errors in the RAID array beyond the fault tolerance level of the underlying RAID technique increases resiliency and availability of the storage system.

31 Claims, 10 Drawing Sheets

MECHANISM FOR CORRECTING ERRORS BEYOND THE FAULT TOLERANT LEVEL OF A RAID ARRAY IN A STORAGE SYSTEM

FIELD OF THE INVENTION

The present invention pertains to storage systems and more particularly, to mechanisms for increasing resiliency and availability of a storage system.

BACKGROUND

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic, optical storage disks, flash devices, or tapes. Alternatively, a storage system can provide clients with a block-level access to stored data, rather than file-level access or with both file-level access and block-level access.

Data can be stored on "volumes" comprising physical storage devices defining an overall logical arrangement of storage space. The devices within a volume are typically organized as one or more groups of Redundant Array of Independent (or Inexpensive) Disks (RAID). RAID implementations enhance the reliability and integrity of data storage through the redundant writing of data stripes across a number of storage devices in the RAID group.

In a storage system, data can be lost or corrupted, for example due to media errors, data corruptions, shelf failures, etc. A media error on a storage device occurs when data cannot be read from a particular block or a number of blocks. Typically, storage systems rely on various redundancy schemes to protect against failures. One such known technique provides for mirroring of data at a destination storage system by preferably transferring changes to the data along with metadata. For example, SnapMirror®, a product provided by NetApp, Inc., Inc., Sunnyvale, Calif., can be used to establish and maintain mirror relationship between a source storage system and a destination storage system and to provide data updates to the destination storage system.

Another known mechanism that is employed in a storage system to protect data against failures is RAID technology, which includes various data protection techniques, such as RAID-1, RAID-4, RAID-5, or NetApp's RAID-DP™. The fault tolerance limit of each technique defines the maximum number of errors which can be successfully recovered. As a result, the availability and resiliency of the storage system is very closely related to the RAID protection level utilized. In RAID-1, the contents of a storage device are mirrored at another storage device. Since only half of the available space can be used for data, RAID-1 protection scheme is typically very expensive to employ.

In RAID-4, RAID-5, and RAID-DP™, a data protection value (e.g., redundant parity) is calculated and is stored at various locations on storage devices. Parity may be computed as an exclusive-OR (XOR) operation of data blocks in a stripe spread across multiple storage devices in an array. In a single parity scheme, e.g. RAID-4 or RAID-5, an error can be corrected in any block in the stripe using a single parity block (also called "row parity"). In RAID-DP™, errors resulting from a two-storage device failure can be corrected using two parity blocks, a row parity and a diagonal parity.

Occasionally, a RAID array may experience a situation when a number of errors exceeds the ability of the RAID protection level to correct the error, thereby causing an unrecoverable error condition. The following combinations of errors for RAID-4 may cause an unrecoverable error condition: one failed storage device and one media error on another storage device; one failed storage device and one checksum error on another storage device; two media errors in the same stripe; one media error and one checksum error in the same stripe; one media error and one missing block error. For a dual parity array having RAID-DP, at least triple errors cause unrecoverable error. As used herein, a "media error" occurs when a read operation is not successful due to the problems with the media on which the data reside. A "checksum error" occurs when a data integrity verification signature of a data block is failed. A "missing block error" takes place when the block range of the storage device that RAID attempts to read does not exist.

When an unrecoverable error condition occurs, it may lead to data corruption in the storage system. Currently, when unrecoverable error is encountered by the RAID system, a data block is flagged to indicate that it has an unrecoverable error. If a storage device fails and the data are reconstructed to a replacement storage device, the reconstructed data will be bad if the data block had encountered an unrecoverable error. As a result, a data block with an error is provided to a client device. Other existing techniques create a log of locations of the data blocks with unrecoverable errors. Such a log is created after the unrecoverable errors are detected. On every client request, the log is checked to determine if a data block indicated in a client request has an unrecoverable error. Checking a log entails reading the log from the storage device, if the log is not cached in a memory device. Such a process consumes bandwidth of the storage device and delays processing of the client request. Since the log is not reliable and can be lost if, for example, a storage device where the log resides fails, such a mechanism does not provide sufficient guarantee that the storage system will be able to identify data blocks that sustained an unrecoverable error. As a result, a data block with an error will be provided to a client.

Regardless of which conventional technique is used to keep track of unrecoverable errors, when an unrecoverable error is encountered at a storage system, RAID panics the storage system and marks the corresponding aggregate inconsistent, thereby triggering a file system consistency check operation prior to serving a data access requests. The term "aggregate" is used to refer to a pool of physical storage, which combines one or more physical mass storage devices or parts thereof, into a single storage object. File system consistency check involves scanning the entire file system to determine if all metadata, e.g., file sizes, blocks allocated per file, etc., are consistent. During this process, if more unrecoverable errors are detected, they are added to the log. The file system consistency check may create a "lost and found" data structure indicating missing data. Running a file system consistency check has a number of shortcomings. For example, the file system consistency check does not recover the original client data block that sustained an error. Furthermore, running the file system consistency check leads to disrupting client access to the storage system.

Accordingly, what is needed is a mechanism for improving resilience and availability of a RAID array in a storage system when RAID encounters unrecoverable errors.

SUMMARY OF THE INVENTION

Embodiments described herein provide novel, reliable and efficient technique for tolerating and correcting unrecoverable errors (i.e., errors that cannot be corrected by the existing RAID protection schemes) in a RAID array by reducing the need to perform drastic recovery actions, such as a file system consistency check, which typically disrupts client access to the storage system. Advantageously, ability to tolerate and correct errors in the RAID array beyond the fault tolerance level of the underlying RAID technique increases resiliency and availability of the storage system.

According to one aspect of the invention, when data blocks in an array encounter unrecoverable errors, these data blocks are marked as invalid (by, e.g., having a pseudo-bad indicator set within a close proximity of the data block so that when an I/O request is sent to read a data block, a pseudo-bad indicator is also read as part of the same I/O request). Then the pseudo bad indicators are protected by a corresponding RAID protection level (by e.g., computing a parity value for the pseudo-bad indicators in RAID-4 and RAID-5 implementations or mirroring the pseudo-bad indicator in RAID-1 implementation). Once the data blocks are marked invalid and the corresponding pseudo-bad indicators are protected by the underlying RAID technique, the RAID array may continue serving the client requests. The data blocks that sustained unrecoverable errors are referred to herein as "bad" data blocks. Advantageously, parity protecting the pseudo-bad indicators in a stripe where the bad data blocks reside (or mirroring the indicators in the case of RAID-1) ensures that the RAID system reliably maintains information about bad data blocks if the device where the bad data blocks resides fails and original data, including bad data blocks, are reconstructed and written to a replacement storage device. This ensures that data blocks that sustained unrecoverable error will not be provided to a client upon a data access request.

According to another aspect of the invention, the error recovery of the data blocks that sustained unrecoverable error can be initiated asynchronously, i.e., at any time after the data access request to the storage devices during which an error was sustained. As part of the asynchronous error recovery, novel techniques described herein leverage the ability of the storage system to maintain a "good" copy(s) of the "bad" data blocks both locally (i.e., stored in a buffer cache memory or in a snapshot) or remotely (e.g., stored at a mirrored destination storage system). A "good copy" of the data block refers to a data identical to the original data that was written to the data block and that does not have a pseudo-bad indicator set. Essentially, a good copy of the data block does not have an error and thus can be reliably used in the data recovery operation. As part of the data recovery operation, the storage system determines if a copy of the data block exists using underlying data redundancy techniques (e.g., remote mirroring, remote snapshots, backup data or data stored in a local memory). Then, the storage system determines if the copy is a good copy (e.g., it is not corrupted) using data verification techniques. Once it is determined that the copy is indeed a good copy, the storage system writes the good copy of the data block either in place of the bad data block or at a different location. The storage system then clears the indication that the data block is "bad". Advantageously, since immediate availability of a "good" copy of the bad data block is not a constraint, recovery can take place at any time after the data access request to the storage devices was initiated.

According to yet another aspect of the invention, recovery of a data block that sustained an unrecoverable error takes place synchronously to the I/O request during which an error was detected. The synchronous data recovery mechanism similarly uses underlying data redundancy techniques to obtain a good copy of the data block having the unrecoverable error.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

RAID Protection Levels

Figure 1A:
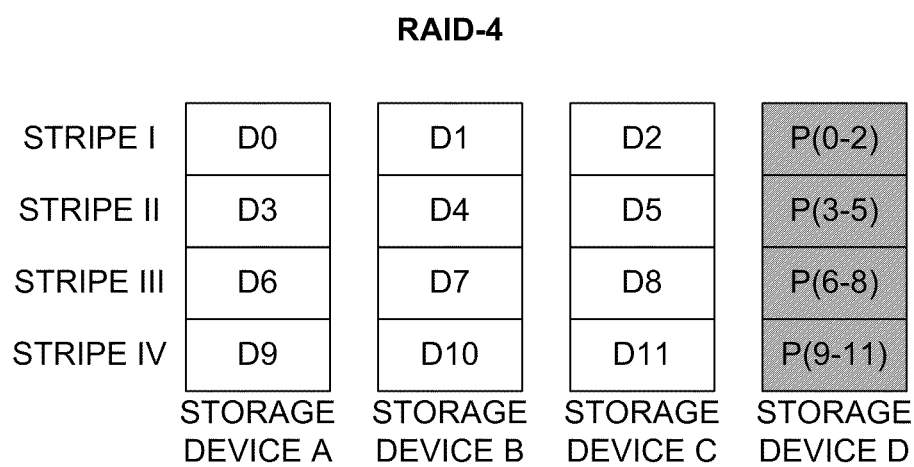
FIGS. 1A and 1B illustrate arrangements of data blocks on storage devices according to RAID-4 and RAID-5 levels of protection.
Figure 1B:
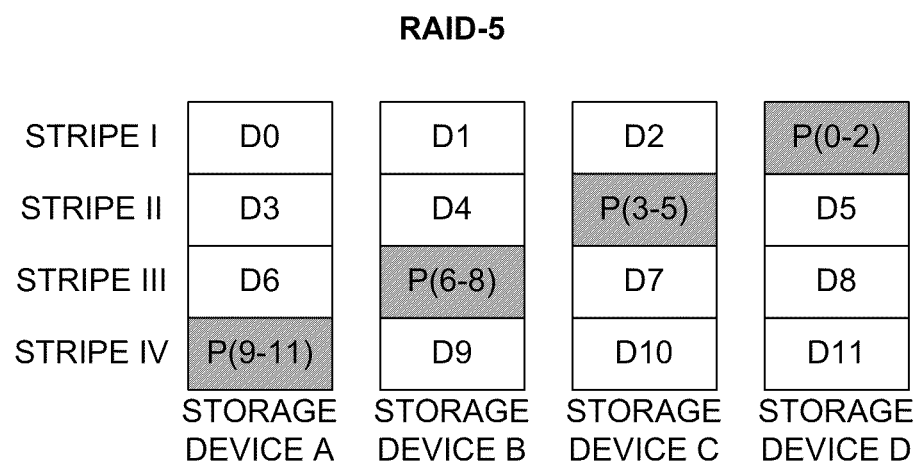

Referring now to FIGS. 1A and 1B, arrangements of data blocks on storage devices using parity blocks are illustrated. In FIGS. 1A and 1B, data sent to a storage system (shown in FIG. 2) from a client(s) for storage as part of a write operation may first be divided up into fixed-size, e.g., four Kilo Byte, blocks (e.g. D0, D1, etc.), which are then formed into groups that are stored as physical data blocks in a "stripe" (e.g. Stripe I, Stripe II, etc.) spread across multiple devices (e.g., disks) in an array. Row parity, e.g. an exclusive-OR (XOR) of the data in the stripe, is computed and may be stored in a parity protection block on storage device D. The row parity, e.g., P(0-2), may be used to reconstruct a single lost or corrupted data block in Stripe I. The location of the row parity depends on the type of protection scheme or protocol implemented. FIG. 1A shows a RAID-4 scheme in which the row parity, e.g. P(0-2), P(3-5), P(6-8), and P(9-11) are stored in storage device D. FIG. 1B shows a RAID-5 scheme in which the row parity is distributed across storage devices in the array. For example, P(0-2) is stored on storage device D, P(3-5) is stored on storage device C, P(6-8) is stored on storage device B, and P(9-11) is stored on storage device A. It should be noted that for convenience, storage devices shall be described in the contexts of disks. Those skilled in the art, however, can understand that the invention it not limited to "disks" and can be implemented on other storage devices.

As described earlier, storage devices in a storage array may experience multiple errors, which exceed the tolerance of the RAID protection scheme. That is, for the RAID-4 protection scheme, the following combinations of errors may cause unrecoverable error: one failed storage device and one media error on another storage device; one failed storage device and one checksum error on another storage device; two media errors in the same stripe; one media error and one checksum error in the same stripe. A checksum is a calculated value used to verify data integrity when data are written to a data storage device. For a dual parity array protected by RAID-DP, having at least triple errors may cause unrecoverable error. As described herein, a media error occurs when a read operation is not successful due to the problems with the media on which the data reside. A checksum error occurs when a data integrity verification signature of a data block is failed (verification signature will be described in more details below). A missing block error takes place when the range of the storage device that RAID attempts to read does not exist.

Still with reference to FIGS. 1A and 1B, an unrecoverable error may occur if storage device A fails and data block D4 has a media error. RAID-4 is unable to recover those data blocks that sustained the error. Similarly, if data blocks D3 and D4 experience a media error, these data blocks cannot be recovered by the current RAID protection level since the number of errors exceeds the RAID protection level. Continuing with the same example, if data block D7 in Stripe III has a media error and data block D8 in the same stripe has a checksum error, these data blocks cannot be recovered since the number of errors exceeds the RAID level. As will be described in more detail herein, embodiments of the present invention provide efficient mechanism by which unrecoverable error conditions detected by a RAID system can be efficiently and reliably tracked in a manner which allows the RAID array to operate without incurring downtime. According to one aspect of the invention, when data blocks in an array encounter unrecoverable errors, these data blocks are marked as invalid (by, e.g., having a pseudo-bad indicator set within a close proximity to the data block) and then parity protecting the pseudo-bad indicator in a stripe where the data block resides on a storage device (or mirroring if the underlying RAID protection layer is RAID-1). Once the data blocks are marked as invalid and the pseudo-bad indicator is parity protected, the RAID array may continue serving the client requests. Advantageously, parity protecting the pseudo-bad indicator in a stripe where the bad data blocks reside or mirroring the pseudo-bad indicator if the underlying RAID protection layer is RAID-1 ensures that the RAID system will be able to "remember" that the bad data blocks in a stripe sustained an unrecoverable error even if the device where the bad data blocks resides fails and is reconstructed to a replacement. In existing systems, when a storage device fails and is replaced with a new storage device, redundant parity information is used to reconstruct data blocks in a stripe. For example, in RAID-4 implementation, the row parity is used to reconstruct a data block in a stripe. In RAID-DP, the row and diagonal parity are used to reconstruct a data block. The reconstructed data are written to the new storage device during reconstruction process. As a result, original data blocks, including the "bad" ones, are written to the new storage device and provided to the client upon the data access request. The new mechanism allows the storage system to identify bad data blocks. When original data are reconstructed from parity that protects data in a stripe and written to the replacement storage device, all pseudo-bad indicators are also reconstructed from a parity that protects the pseudo-bad indicators in a stripe. The pseudo-bad indicators are written to the replacement storage device. When a client issues a data access request, the RAID system uses the reconstructed pseudo-bad indicator to determine if the requested data block is bad. The RAID system provides an error to the file system if the data block is bad. The file system, in turn, sends an error to the client.

Storage System Environment

Figure 2:
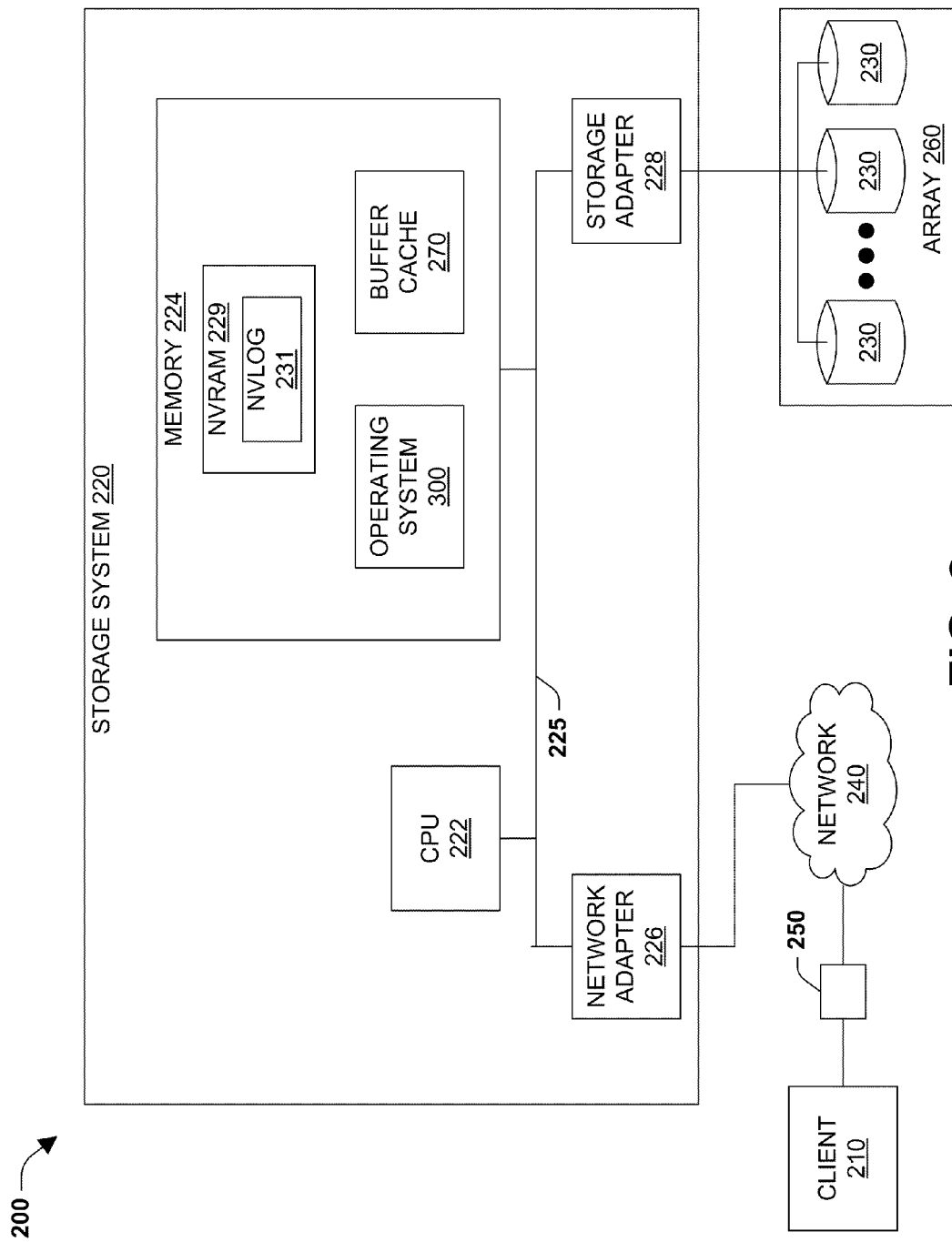
FIG. 2 shows network environment that includes a storage system according to an embodiment of the present invention.

FIG. 2 is a schematic block diagram of environment 200 including a storage system 220 that may be advantageously used with the present invention. The storage system is a computer that provides storage service relating to the organization of information on storage devices, such as disks 230 of a storage array 260, which can be implemented as a RAID array. The storage system 220 comprises a central processing unit (CPU) 222, a memory 224, a network adapter 226, a non-volatile random access memory (NVRAM) 229 and a storage adapter 228 interconnected by a system bus 225. The storage system 220 also includes an operating system 300 that preferably implements a high-level module, such as a file system (i.e., file system 310), to logically organize the information as a hierarchical structure of directories, files and special types of files called virtual disks (hereinafter "blocks") on the disks.

In the illustrative embodiment, the memory 224 comprises storage locations that are addressable by the processor and adapters for storing software program code. A portion of the memory may be further organized as a "buffer cache" 270 for storing data structures associated with the present invention. Buffer cache can be implemented as a non-volatile computer storage, such as a flash memory or solid-state memory.

Additionally, the NVRAM 229 may be utilized for storing changes to the file system between consistency points. A consistency point is a point in time at which data stored in NVRAM is sent to data storage devices, such as disks, for storage. Such changes may be stored in a nonvolatile log (NVLOG) 231 from which they can be flushed to a storage device during the course of a consistency point. The processor and adapters may, in turn, comprise processing elements and/or logic circuitry configured to execute the software code and manipulate the data structures. Operating system 300 portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the storage system 220 to a client 210 over a network 240, which may comprise a point-to-point connection or a shared medium, such as a local area network. Illustratively, the network 240 may be embodied as an Ethernet network or a Fibre Channel (FC) network. The client 210 may communicate with the storage system over network 240 by exchanging discrete frames or packets 250 of data according to pre-defined protocols, such as the Transmission Control Protocol/Internet Protocol (TCP/IP). The client 210 may be a general-purpose computer configured to execute applications (not shown in FIG. 2). Moreover, the client 210 may interact with the storage system 220 in accordance with a client/server model of information delivery. That is, the client may request the services of the storage system, and the system may return the results of the services requested by the client, by exchanging packets 250 over the network 240. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. The storage adapter 228 cooperates with the operating system 300 to access, at a storage device(s), data requested by a client. Storage of data on array 260 is preferably implemented as one or more storage "volumes" that comprise a collection of physical storage devices 230, such as disks which define an overall logical arrangement of volume block number (VVBN) space on the volume(s). Each logical volume is generally, although not necessarily, associated with its own file system.

The storage devices within a logical volume are typically organized as one or more groups, wherein each group may be operated as a Redundant Array of Independent (or Inexpensive) Disks (RAID). Most RAID implementations, such as a RAID-4 level implementation, enhance the reliability of data storage through the redundant writing of data "stripes" across a given number of physical storage devices in the RAID group, and the appropriate storing of parity information with respect to the striped data (as illustrated in reference to FIGS. 1A and 1B). As described above, the physical storage devices of each RAID group include those storage devices configured to store striped data (D) and those configured to store parity (P) for the data, in accordance with an illustrative RAID-4 level configuration. Those skilled in the art will understood that other types and levels of RAID implementations may be used in accordance with the inventive principles described herein. Those skilled in the art would understand that the data may be stored on any type of attached array of writable storage device media such as video tape, optical, DVD, flash, magnetic tape, bubble memory, electronic random access memory, micro-electro mechanical and any other media adapted to store data blocks and parity information.

Operating System

To facilitate access to the storage devices, the operating system 300 implements a write-anywhere file system 310 that "virtualizes" the storage space provided by storage devices. Those skilled in the art would understand that any file system can be implemented in the context of the present invention. The file system logically organizes the information as a hierarchical structure of directory and data objects, such as files or data containers, on the storage devices. Each data object may be implemented as a set of blocks configured to store information, such as data, whereas the directory may be implemented as a specially formatted file in which names and links to other files and directories are stored. In the illustrative embodiment, the operating system is preferably NetApp® Data ONTAP® operating system available from NetApp, Inc., Sunnyvale, Calif., that implements a Write Anywhere File Layout (WAFL®) file system. However, it is expressly contemplated that any operating system may be enhanced for use in accordance with the inventive principles described herein. As such, where the term "ONTAP" is employed, it should be taken broadly to refer to any operating system that is otherwise adaptable to the teachings of this invention. As used herein, the term "operating system" generally refers to the computer-executable code operable on a computer that manages data access and may, in the case of a storage system, implement data access semantics, such as the Data ONTAP® operating system, which is implemented as a microkernel. The operating system can also be implemented as an application program operating over a general-purpose operating system, such as UNIX® or Windows XP®, or as a general-purpose operating system with configurable functionality, which is configured for storage applications as described herein.

Figure 3:
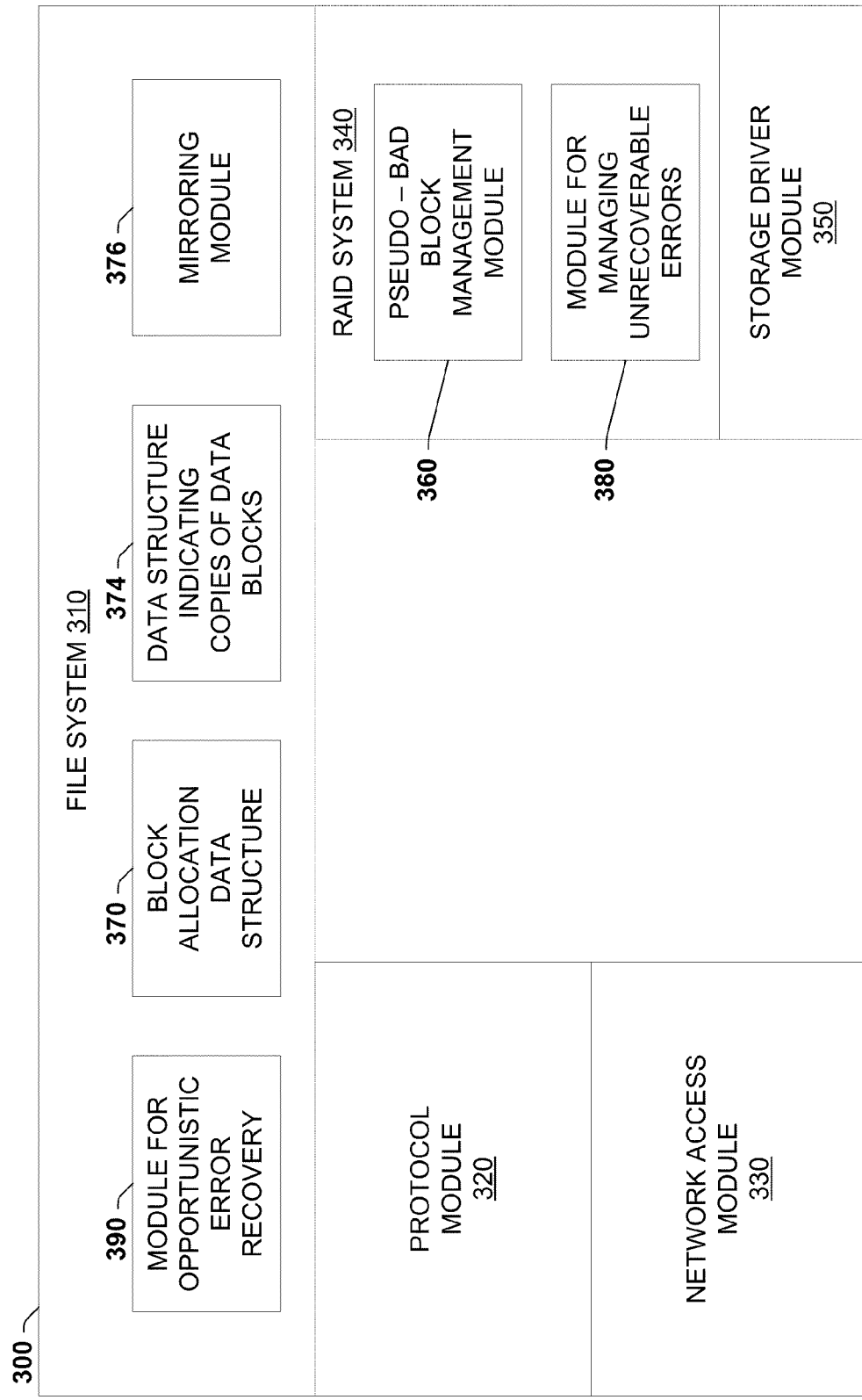
FIG. 3 is a block diagram illustrating various components of the operating system of the storage system of FIG. 2 according to an embodiment of the present invention.

FIG. 3 is a schematic block diagram of the operating system 300 that may be advantageously used with the present invention. The operating system comprises a number of components organized to form an integrated network protocol module or, more generally, a multi-protocol engine that provides data paths for clients to access information stored on the multi-protocol storage system using block and file access protocols. These modules are a protocol module 320, a network access module 330, a RAID system 340, a pseudo-black management module 360, a storage driver module 350, and a file system 310, which includes other components and data structures to be discussed below.

The protocol module 320 implements one or more of various high-level network protocols, such as Network File System (NFS), Common Internet File System (CIFS), Hypertext Transfer Protocol (HTTP) and/or Transmission Control Protocol/Internet Protocol (TCP/IP) to encode incoming client requests or encode outgoing responses to the client request in the appropriate protocol.

The network access module 330 includes one or more drivers (not shown), which implement lower-level protocols to communicate over the network, such as Ethernet (e.g., network 240 shown in FIG. 2). The protocol module 320 and the associated network access module 330 allow the storage system 220 to communicate over the network 240 (e.g., with clients 210).

RAID system 340 (also referred to herein as a "storage module") manages data storage and retrieval in response to data access requests from clients 210, which may include requests to write data and/or to read data. In one embodiment, RAID system can be a software module implemented on the storage system 220. In an alternative embodiment, RAID system 340 can be a separate enclosure implemented as hardware. RAID system also performs data access request as part of performing background operations, such as data scrubbing, data reconstruction, and the like. The purpose of background operations is to detect and correct any errors before a client accesses data.

Storage driver module 350 allows storage system 220 to communicate with the storage devices, such as disks 230. The storage driver module 350 implements a lower-level storage device access protocol, such as Fibre Channel Protocol (FCP), Small Computer Systems Interface (SCSI) protocol, Serial ATA (SATA), or Serial Attached SCSI (SAS). Storage driver module 350 issues I/O commands (or data access request commands) to storage devices to write data at physical block numbers and to read data from the storage devices.

Continuing with the description of various components of the operating system 300, the file system 310 illustratively implements the WAFL file system having an on-disk format representation that is block-based using, e.g., 4 kilobyte (KB) blocks and using inodes to describe the data containers. The WAFL file system uses data containers, which could be files and other objects, to store metadata describing the layout of its file system; these metadata data containers include, among others, an inode file. A file handle, i.e., an identifier that includes an inode number, is used to retrieve an inode from storage devices.

As will be described below, storage system 220 may handle various types of I/O data access requests, such as client I/O requests to the storage system and I/O requests between, e.g., RAID system and the storage devices. Client I/O requests are received by the storage system from clients (such as client 110) and are processed by the storage system prior to initiating system I/Os to the storage devices. Operationally, an I/O data access request from the client 110 is forwarded as a packet over the computer network 240 onto the storage system 220 where it is received at the network adapter 226 (shown in FIG. 2). The network access module 330 processes the packet and, if appropriate, passes it on to the protocol module 320 for additional processing prior to forwarding to the file system 310. The file system generates operations to retrieve the requested data from disk 230 if it is not resident "in-core," i.e., in the memory 224. To that end, the file system 310 indexes into the inode file using the inode number to access an appropriate entry and retrieve a logical volume block number (VVBN). Each block in the VVBN space and in the PVBN space is typically fixed, e.g., 4 kB, in size. The storage device location specified by the RAID system 340 is further translated by the storage driver module 350 of the operating system 300 into a plurality of sectors (e.g., a 4 kB block which a RAID header translates to 8 or 9 disk sectors of 512 or 520 bytes) on the specified disk so that the data block will be written to a disk at the next consistency point (a consistency point is the recurring event at which any new or modified data that have been temporarily cached in the storage system's buffer cache (e.g., buffer cache 270) is committed to long-term storage (e.g., disks). Although the above description refers to storage devices as "disk", those skilled in the art would understand that any storage device can be employed by the storage system. A consistency point typically occurs periodically, i.e., from time to time (e.g., every 10 seconds) or in response to a predetermined condition occurring (e.g., a specified percentage of memory is full of "dirty" data)). A retrieved data block may be loaded from disk 230 into the buffer cache 270. When a data block is loaded from disk 230 into buffer cache 270, its corresponding in-core structure embeds the on-disk structure. Upon completion of the request, the storage system (and operating system) returns a reply to the client 110 over the network 240. It should be noted that the software "path" through the operating system layers described above to perform data storage access for the client request may alternatively be implemented in hardware as logic circuitry embodied within a field programmable gate array (FPGA) or an application specific integrated circuit (ASIC).

File system 310 is capable of allocating free blocks on a storage device to store data. As used herein, data blocks that are currently occupied by any data or metadata are called "allocated data blocks." Data blocks that are not occupied by any data or metadata are called "free data blocks" or "unallocated data blocks." File system uses a block allocation data structure, such as for example, block allocation data structure 370, to select free data blocks within its PVBN space to which to write new data. In one embodiment, block allocation data structure 370 is implemented as a bitmap in which a value of "1" may indicate that a data block is allocated and a value of "0" (zero) may indicate that a data block is not allocated. Those skilled in the art would understand that other values may indicate whether a particular data block is allocated.

It is useful now to consider how data can be structured and organized by the storage system 220 in certain embodiments. In at least one embodiment, data are stored in the form of volumes, where each volume contains one or more directories, subdirectories, and/or data containers. The term "aggregate" is used to refer to a pool of physical storage, which combines one or more physical mass storage devices (e.g., disks) or parts thereof, into a single storage object. An aggregate also contains or provides storage for one or more other data sets at a higher-level of abstraction, such as volumes. As described herein, "volume" is a set of stored data associated with a collection of mass storage devices, such as disks, which obtains its storage from (i.e., is contained within) an aggregate, and which is managed as an independent administrative unit, such as a complete file system. A volume includes one or more file systems, such as an active file system and, optionally, one or more persistent point-in-time images of the active file system captured at various instances in time. As stated above, a "file system" is an independently managed, self-contained, organized structure of data units (e.g., data containers, blocks, or logical unit numbers (LUNs)). A volume or file system (as those terms are used herein) may store data in the form of data containers, data objects, files, as well as logical block numbers (LUNs). Thus, although the discussion herein uses the term "file" for convenience, one skilled in the art will appreciate the storage system 220 may store any type of data object, such as a data container.

Figure 4:
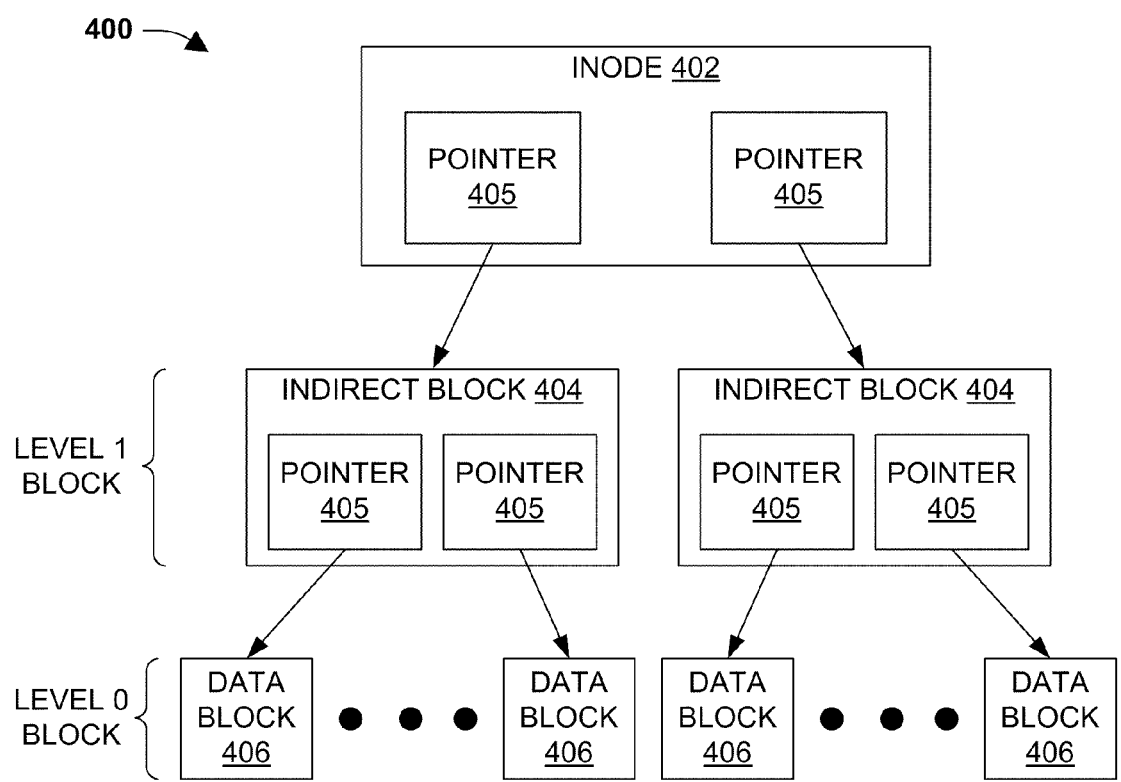
FIG. 4 is a block diagram of a buffer tree of a data container stored at the storage system shown in FIG. 2.

In certain embodiments, a data container is represented in the storage system in the form of a buffer tree, which is a hierarchical structure typically used to store data containers, including pointers to data containers. With reference to FIG. 4, a buffer tree includes one or more levels of indirect blocks 404 (called "L1 blocks", "L2 blocks" (not shown), etc.), each of which contains one or more pointers 405 to lower-level indirect blocks and/or to the direct blocks (called "L0 blocks" or "data blocks") of the file. The pointers include a Physical Volume Block Number of a data block in an aggregate (PVBN) and a Virtual Volume Block Number (VVBN). Every inode and indirect block in the container buffer tree also includes PVBN for every lower level block that it references.

The data in the data container is stored only at the lowest level (L0) blocks. The root of a buffer tree is stored in the "inode" 402 of the data container. As noted above, an inode is a metadata container that is used to store metadata about the data container, such as ownership, access permissions, data container size, data container type, and pointers to the highest-level of indirect blocks for the data container. Each data container has its own inode. The inode is stored in a separate inode container, which may itself be structured as a buffer tree. The inode container may be, for example, an inode file. In hierarchical (or nested) directory file systems, such nesting results in buffer trees within buffer trees, where subdirectories are nested within higher-level directories and entries of the directories point to files, which also have their own buffer trees of indirect and direct blocks. A directory entry may point to another directory in the file system. In such a case, the directory with the entry is said to be the "parent directory," while the directory that is referenced by the directory entry is said to be the "child directory" or "subdirectory."

Referring again to FIG. 3 and continuing with the description of the operating system 300 shown in FIG. 3, file system further includes a mirroring module 376, which provides for replication of some or all of the underlying data and/or the file system that organizes the data. In one example, a replicated copy is created and stored at a destination storage system (shown in FIG. 8), making it more likely that recovery is possible in the event of a disaster that may physically damage the main storage location (i.e., storage system 220). Various mechanisms are used to create a copy of a dataset (such as a file system, a volume, a directory, or a file) at a remote site. As will be described in more details below, inventive techniques utilize a destination storage system to obtain a copy of a data block that sustained unrecoverable error condition at the storage system 220. The mirroring module 376 in accordance with an illustrative embodiment of this invention is responsible for updating a destination dataset (or a mirror) at the destination storage system. Briefly, mirroring module 376 has two components. One component, which is executed at the storage system 220, is responsible for identifying changes between a base snapshot (i.e., the most recent snapshot transferred to the destination successfully) and a current snapshot of the source file system and transferring the changes (and preferably only the changes along with metadata) to the destination storage system over the network. As used herein, a "snapshot" is a read-only, persistent, point-in-time image (RPPI) of the file system that enables quick recovery of data after data has been corrupted, lost, or altered. Snapshots can be created by copying the data at each predetermined point in time to form a consistent image, or virtually, by using pointers to form the image of the data. The copy is updated at regular intervals, typically set by an administrator, by sending changes in the most current snapshot since a previously copied snapshot, in an effort to capture the most recent changes to the file system. The second component of the mirroring module 376 is executed on the destination storage system. The second component is responsible for searching a mirror copy of the data set and providing the mirrored copy to storage system 220 on request. As described above, SnapMirror®, a product provided by NetApp, Inc., Inc., Sunnyvale, Calif. can be used to establish and maintain mirror relationship between a source storage system and a destination storage system and to provide infinite updates to the destination storage system using snapshots is.

Still with reference to FIG. 3, file system 310 further maintains a data structure for storing information about copies of the data blocks (such as copies stored in a buffer cache 270, in a snapshot, or at a destination storage system). Data structure 374 in one implementation maintains mappings between a source volume at the storage system 220 where the data is stored and a destination volume at the destination storage system where the mirrored data is stored. Data structure 374 may also store the mapping between VVBN of the source volume at the storage system where the data is stored and VVBN of the destination volume at the destination storage system where the mirrored data is stored. Data structure 374 may also store addresses of data blocks that are cached in buffer cache 270.

Continuing with the description of the operating system 300, RAID system 340 includes a pseudo-bad block management module 360, detailed operations of which will be described in greater details in reference to FIG. 6. Briefly, RAID system 340 is configured to detect an error in the array, to initiate a recovery operation, and to pass the control to pseudo-bad block management module 360 upon determination that the array suffered an unrecoverable error condition; that is, RAID system 340 is unable to recover data blocks sustained the error due to the number of errors exceeding the current level of protection of the RAID system. Pseudo-bad block management module 360, in turn, is responsible for marking data blocks that sustained errors as invalid. As will be described in more detail herein, module 360 sets a pseudo bad indicator (such as a flag or a bit value) within a close proximity to the data block that sustained unrecoverable error. As used herein, writing a pseudo-bad indicator within a close proximity to the data block means that when an I/O request is issued to a data block, the pseudo-bad indicator will also be read as part of the same I/O. In one implementation, the pseudo-bad indicator is written in the checksum area adjacent to the data block.

Module 360 is further adapted to write an identifiable bit pattern to the data blocks that contributed to the unrecoverable error condition. When a media error occurs on a storage device, the storage device cannot provide the data stored on the media. As a result, the storage system needs to write some information to correct the data blocks with an unrecoverable error. Writing such an identifiable bit pattern, in one implementation, may include writing "zeroes" to the data blocks or other information to analyze origins of the error. Module 360 is then configured to re-compute parity since new data (i.e., the pattern) are written to the data blocks. Re-computing parity in the stripe provides the following advantage. If any new errors were to develop in that stripe, those errors would be recoverable. If the parity were not recomputed, then even a single new error in the stripe becomes unrecoverable.

Module 360 is also responsible for parity-protecting the pseudo-bad indicator in a stripe where unrecoverable errors occurred. Advantageously, parity protecting the pseudo-bad indicator in a stripe where the bad data blocks reside or mirroring the pseudo-bad indicator if the underlying RAID protection layer is RAID-1 (e.g., writing the mirrored pseudo-bad indicator within the close proximity to the mirrored data block) ensures that the RAID system will be able to "remember" that the bad data blocks in a stripe sustained an unrecoverable error even if the device where the bad data blocks resides fails and is reconstructed to a replacement. In existing systems, when a storage device fails and is replaced with a new storage device, redundant parity is used to reconstruct data blocks in a stripe. The reconstructed data are written to the new storage device during reconstruction process. As a result, original data blocks, even the "bad" ones, are written to the replacing storage device and provided to the client upon the data access request. Since a pseudo-bad indicator is also reconstructed for each data block that sustained an unrecoverable error prior to the failure of the storage device, the reconstructed pseudo-bad indicator can be used to identify bad data blocks even after the storage device fails.

RAID system 340 further includes a module for managing unrecoverable errors 380. Module 380 is configured to receive notification from RAID system 340 that an I/O request encountered an error and RAID system is unable to recover data blocks that contributed to unrecoverable error condition (for example, due to the number of errors exceeding the level of protection of RAID system). RAID system 340 also communicates to module 380 whether the I/O was initiated within RAID system or it was initiated by the file system. Typically, RAID system may initiate I/Os as part of the parity computation or during a process of reconstructing a failed storage device, or as part of other background operations. File system may initiate an I/O request as part of serving a client I/O request. Module 380 for managing unrecoverable errors is responsible for initiating asynchronous error recovery, if the I/O was initiated by the RAID system. In this situation, asynchronous error recovery typically refers to error recovery that is performed after processing of the data request which encountered unrecoverable error condition. Such a data access request was issued to storage devices. Module for management of unrecoverable errors 380 then signals a module for opportunistic error recovery 390 to perform asynchronous error recovery, as described below in FIG. 7. Similarly, if the error was encountered as part of the file system I/O, module for management of unrecoverable errors 380 signals module for opportunistic error recovery 390 to perform opportunistic error recovery, as described below. As will be noted later, when I/O was issued by the file system, error recovery is performed synchronously to the I/O request during which unrecoverable errors were encountered. However, if the file system is unable to recover errors, RAID may still perform asynchronous error recovery at a later time. Furthermore, if the I/O was initiated by the RAID system, error recovery can still take place synchronously to the data access request.

Continuing with the description of the operating system components, module 390 for opportunistic error recovery is responsible for determining if a data block that contributed to an unrecoverable error condition can be recovered by obtaining a "good" copy of the data block (i.e., data that is identical to the data that was lost due to unrecoverable errors and that are not corrupted) using underlying redundancy technique either locally (e.g., from the buffer cache 270 or from a snapshot) or remotely, from a destination storage system. As will be described herein, module 390 uses a VVBN address of a data block tagged with a pseudo-bad indicator in order to obtain a good copy of the data block. Module 390 is also responsible for determining if a data block is allocated and in-use (by, for example, checking block allocation data structure 370). If the data block is not allocated and thus is not in use, then the data block does not need to be fixed and it can be updated by writing "zeroes" into the data block.

It should be noted that a storage device can encounter situations when a "good" copy of the bad data block cannot be located. Under these circumstances, a client device may initiate data recovery. If the data access request to the storage device was initiated by the file system as a result of the client I/O to the storage system and if the good copy of the bad data blocks cannot be located, then an error is returned to the file system. The file system, in turn, propagates the error to the client that initiated the I/O.

Figure 5:
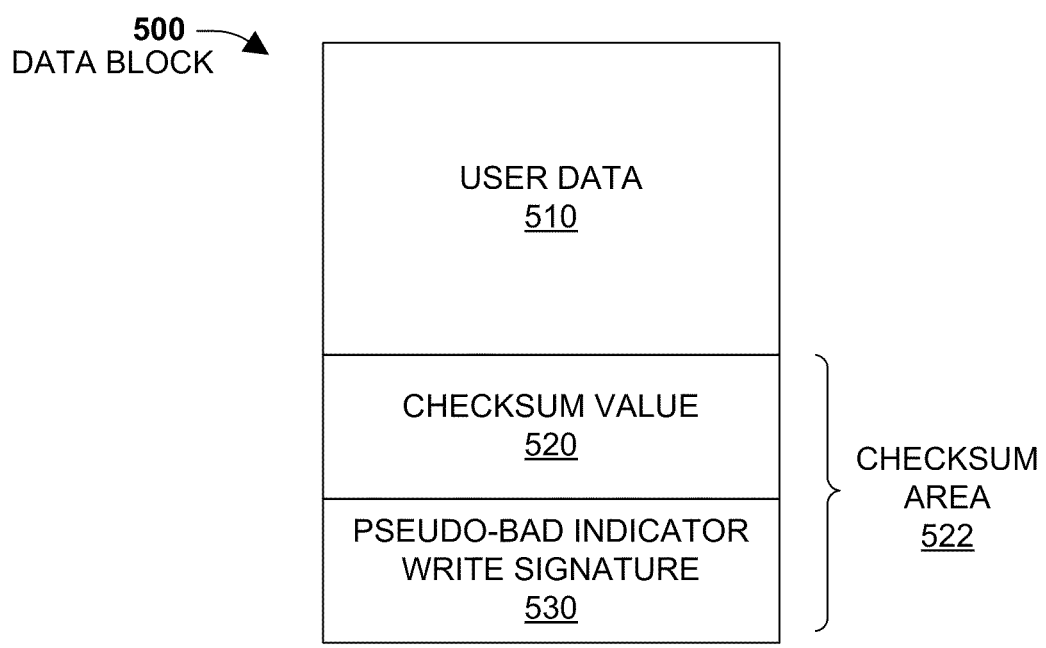
FIG. 5 is a block diagram of an exemplary data block at the storage system shown in FIG. 2.

It is useful now to describe in greater detail various sections of a data block stored on a storage device. For example, consider data block D3 in Stripe II in the array shown in FIG. 1A. Such a data block may store user data provided by the client or metadata describing client data. Referring now to FIG. 5, an exemplary data block 500 is shown, which includes section 510 where client data or metadata are stored. FIG. 5 also shows a checksum area, which is adjacent to the data block 500. The checksum area can occupy, for example, 64 bytes. The checksum area stores a checksum value, which is computed from the data in the data block for the purpose of detecting errors that might have occurred during data transmission or during storage of the data block. When data are written to a storage device, such as disk, a checksum value is computed and is stored in the checksum area. When data is read, integrity of the data is checked by re-computing the checksum and comparing it with the stored one. If the newly computed checksum and the stored one do not match, the data are considered corrupted. In one embodiment, the checksum area 522, in turn, has two sections (each could have a size of 32 bytes). In one implementation, the upper section (i.e., section 520) stores the checksum value. The upper section also contains the VBN (not shown). In one embodiment, the low section, such as section 530, stores a write signature. The write signature or a write verification signature is used to detect a lost-write error or a missing error (as earlier referred to herein). A lost-write error, in turn, refers to an error condition where the storage device acknowledges a successful write completion for both the data and the checksum of a data block, when in fact the write operation is not committed to a storage device. The write signature stamps a unique signature for every write operation. RAID system verifies the write signatures to detect lost writes. The write signature is computed, in one embodiment, using the following information provided by the file system an identification (ID) of a data container (such as a file) stored at a storage device, a block number (such as PVBN), and a consistency point (CP) count. CP count refers to the count of the consistency point and in one embodiment can be stored in the lower 32 byte section of the checksum area. Furthermore, in one implementation, the checksum area includes a pseudo-bad indicator specifying if a data block sustained unrecoverable error. According to embodiments described herein, the pseudo-bad indicator can be cleared if the error recovery was successful and a good copy of the bad data block was obtained.

Methods of Operation

Figure 6:
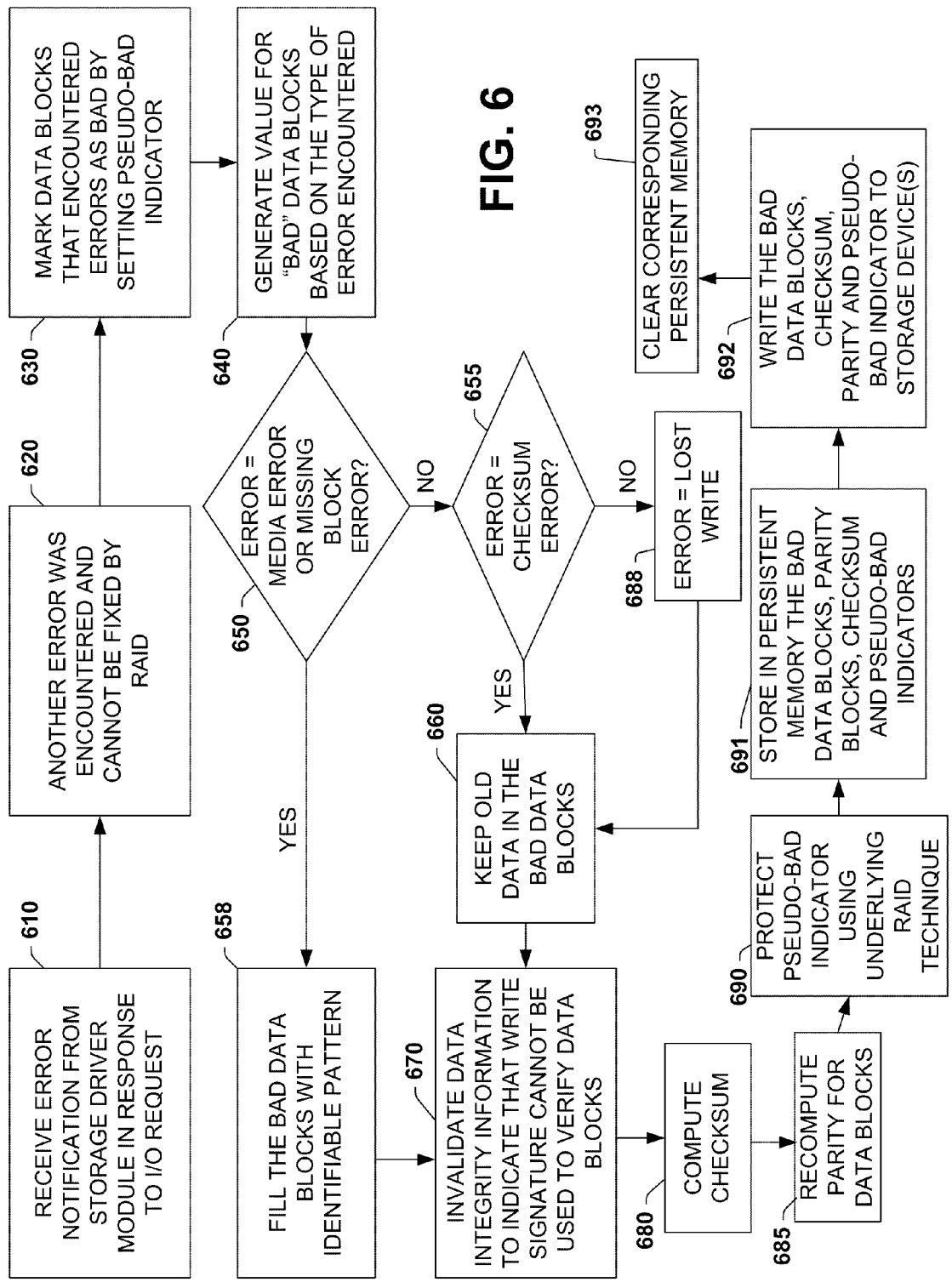
FIG. 6 is a flow diagram of a method for performing pseudo-bad block management at the storage system shown in FIG. 2 according to inventive techniques described herein.

FIG. 6 is a flow diagram of a method for performing pseudo-bad block management at storage system 220 according to inventive techniques described herein. It will be appreciated that while this method (as well as any other methods described herein) is illustrated and described as a series of acts or events, the present disclosure is not necessarily limited by the illustrated ordering of such acts or events. Initially, RAID system 340 receives a communication from the storage driver module (such as module 350) that an error was encountered (step 610). For example, data block D3 in Stripe II as shown in FIG. 1A encountered an error in response to I/O initiated by the RAID system. A read request to D3 may have been initiated as part of a parity computation in Stripe II or during the process of reconstruction of storage device A. The RAID system 340 identifies the error in block D3 and attempts to recover block D3. RAID system 340 initiates a recovery operation by reading other data blocks in the stripe (step 620). Assuming that as part of the recovery operation, RAID system encounters another error, for example, in data block D5 in Stripe II. Such an error could be a media error, a checksum error, or a missing block error, for example. If RAID system 340 is implemented as a RAID-4 or RAID-5 technique, it can recover one error in the stripe using its protection technique. However, since the number of errors in the array exceeds RAID-4 or RAID-5 level of protection, it is said that unrecoverable error condition is encountered. Thus, RAID is unable to recover data blocks D3 and D5 using its protection technique. Other errors may have been encountered as part of the client request.

Currently, if unrecoverable error condition is encountered, drastic recovery actions, like a file system consistency check could be triggered to identify the impacted file system metadata and a user's data container and to prevent further corruption of the file system. Such recovery action results in disrupting client access to the storage system. Importantly, the file system consistency check is unable to recover the client data that sustained unrecoverable errors.

According to embodiments described herein, rather than initiating a disruptive file system consistency check operation, when data blocks in an array encounter unrecoverable errors, these data blocks are marked as invalid by having a pseudo-bad indicator set within a close proximity of the data blocks and then parity protecting the pseudo-bad indicator, or mirroring the pseudo-bad indicator if the underlying RAID protection layer is RAID-1, thereby reliably remembering that a particular data block has an unrecoverable error. Preferably, the indicator can be stored within a close proximity of the data block, e.g., if the storage device is a disk, the indicator can be stored within the next several bytes. Storing a pseudo-bad indicator within a close proximity of the data block ensures that when an I/O request is sent to read a data block, a pseudo-bad indicator is also read as part of the same I/O, without incurring an additional I/O to storage devices.

Still with reference to the flow chart illustrated in FIG. 6, data blocks that encountered an error are marked as pseudo bad by writing a pseudo-bad indicator within a close proximity to the data blocks that encountered the error (step 630). For example, in one embodiment, pseudo-bad block management module 360 shown in FIG. 3 sets a bit in the pseudo-bad indicator within a close proximity to the data block. In one embodiment, the pseudo-bad indicator can be stored in the checksum area adjacent to the data block. It should also be noted that if a data block marked with a pseudo-bad indicator is copied to a remote location, the pseudo-bad indicator is also copied to the remote location along with the bad data block.

At step 640, a value is generated for the data blocks that encountered the error based on the type of error encountered. For example, if the error encountered by the data blocks is a media error or a missing block error (step 650), a bad data block is filled with an identifiable bit pattern (step 658). Such a pattern is referred to as an "identifiable" because it allows the storage system to identify origins of the error. In one implementation, such an identifiable data pattern includes zeroes. If it is determined at step 655 that the error encountered by one or more data blocks is a checksum error, then original data are kept in the bad data block and additional information about the error can be written (step 660). In this situation, old data are preserved because some regions of the data blocks might be good (i.e., not corrupted). Additional information may include a timestamp indicating when an error took place. Similarly, if the error is a lost write, as determined in step 688, the old data are kept in bad the data block (step 660)

At step 670, data integrity information (such as the write signature) for the bad data block is invalidated to indicate that subsequent data access request of the bad data block should not use the write signature to validate the data.

At step 680, checksum of the data blocks is recomputed. To this end, contents of a respective data block are used to compute a checksum and to write the newly computed checksum in the checksum area of the data block where the old checksum (i.e., a value stored prior the data block being rewritten) was stored.

At step 685, new parity is computed for a stripe that has "bad" data blocks. In one implementation, parity can be calculated by reading data blocks which did not have errors, reading newly generated value for "bad" data blocks, reading the old parity (i.e., previously computed parity), and performing a logical XOR operation on the read data. The computed value is written to a storage device that stores parity data, for example in RAID-4 implementation. In RAID-5 implementation, the parity can be stored on more than one storage device in the array. Other methods for calculating parity can be used, such as parity by recalculation method.

Figure 9:
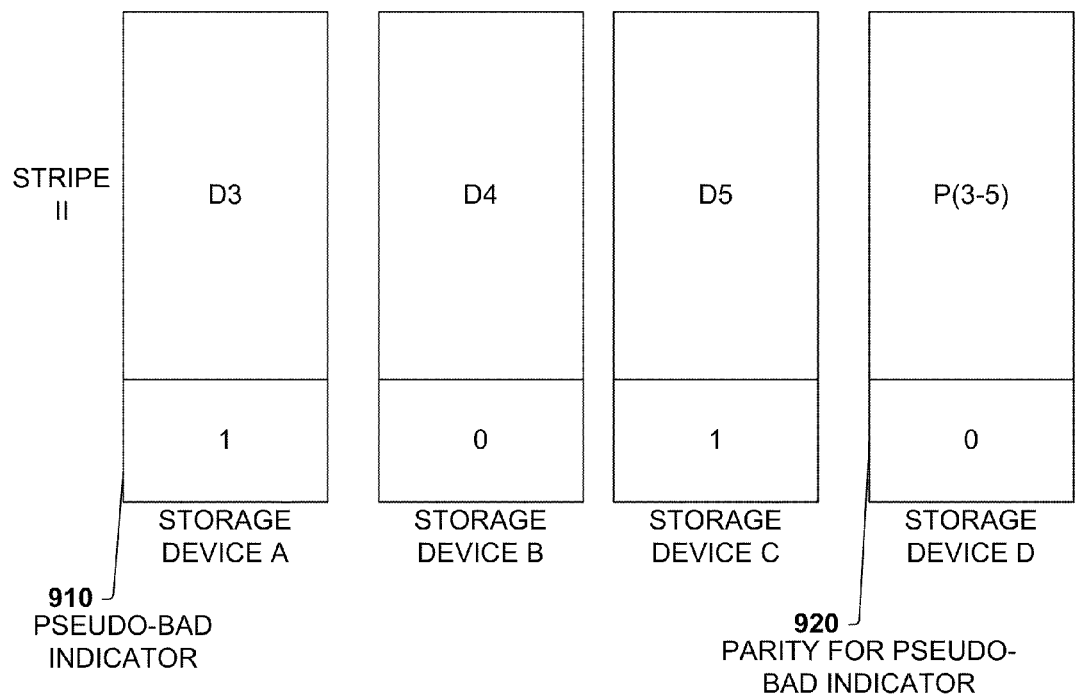
FIG. 9 is a diagram of data blocks having a pseudo-bad indicator set.

At step 690, pseudo-bad indicators are written to the data blocks that sustained errors are parity protected. In the event the underlying RAID technique is RAID-1, protecting the pseudo-bad indicator by RAID involves mirroring the pseudo-bad indicator and writing a minor of the pseudo-bad indicator next to the minor copy of the data block. FIG. 9 is provided to illustrate how pseudo-bad indicators can be parity protected in a stripe, e.g., in RAID-4 implementation. Consistent with the previous example, D3 and D5 sustain unrecoverable error condition. Therefore, a pseudo-bad indicator is set for D3 and D5. Thus, pseudo-bad indicators for data blocks D3 and D5 have a bit value of "1", whereas pseudo bad indicator for data block D4 has a bit value of "0". Parity protecting the pseudo-bad indicators involves reading by the pseudo-bad management module 360 pseudo-bad indicators in a stripe and performing a logical XOR operation. As an example, a logical XOR operation on values {1, 0, and 1} produces "0". Pseudo-bad management module 360 writes the result of the logical operation to the close proximity to the parity block. In one implementation, the parity protecting pseudo-bad indicators are in written to the checksum area of the data block P (3-5) that stores parity for the stripe containing the data block. Similarly, mirroring the pseudo-bad indicator when the underlying RAID protection layer is RAID-1 involves writing a mirror copy of the pseudo-bad indicator within the close proximity of the mirror copy of the original data block. Parity protecting pseudo-bad indicators or mirroring the pseudo-bad indicator when the underlying RAID protection layer is RAID-1 ensures that RAID will be able to remember that the data block has an unrecoverable error even if the storage device on which the data block resides fails. For example, if storage device A fails and original data, including bad data, are reconstructed and written to a replacement storage device, the bad data blocks will be written to the new storage device. A pseudo-bad indicator will also be reconstructed and written back to the replacement storage device. RAID uses the reconstructed pseudo-bad indicator to determine that the data block is bad and should not be provided to the client. In one implementation, to reconstruct a pseudo-bad indicator, RAID XORs the parity protecting the indicators and pseudo-bad indicators stored in data blocks D4 and D5 to determine a pseudo-bad indicator for data block D3. Performing XOR operation on the following values {0, 0, 1) results in "1". Thus, pseudo bad indicator for D3 is "1", which indicates that D3 is a "bad" data block that suffered unrecoverable error condition. Thus, an error is provided to the file system and then in turn to the client in response to the data access request issued to data block D3. At step 691, optionally, the bad data blocks, parity blocks and the checksum information, and the pseudo-bad indicator can be stored in NVRAM (i.e., NVRAM 229 shown in FIG. 1) or battery backed memory, or persistent memory storage. An advantage of storing the bad data block, parity block, and checksum information to NVRAM is that it gives more reliability that the writing operation of the pseudo-bad indicator, checksum area, and a parity block can be replayed subsequent to a system crash, thereby preventing any further corruption of data. At step 692, the bad data blocks, checksum, parity and pseudo-bad indicator are written to storage devices. Then, at step 693 after the write to pseudo bad indicator completes, the persistent memory, such as NVRAM, is cleared. Once pseudo-bad management module 360 has identified all data blocks that contributed to the unrecoverable error condition, module for management of unrecoverable errors 380 gathers unrecoverable errors to be corrected by, for example, creating a list of data blocks in which a pseudo-bad indicator is set in the checksum area. Module 380 then initiates asynchronous error recovery, if the I/O request was initiated by the RAID system as part of the RAID internal operations. As discussed above, asynchronous error recovery is not performed during the processing of the I/O to the storage devices when unrecoverable error was encountered. Rather, the recovery is performed at a later time. Module for management of unrecoverable errors 380 then signals a module for opportunistic error recovery 390 to perform opportunistic error recovery, as described below in reference to flow diagram in FIG. 7. It should be noted that the error recovery can be performed asynchronously to the I/O that encountered unrecoverable error condition. Alternatively, the error recovery can be performed synchronously to the I/O that encountered unrecoverable error condition. Synchronous error recovery may increase the client I/O request latency. Importantly, whether the recovery takes place asynchronously to the I/O to the storage devices or synchronously, embodiments described herein provide for error recovery by obtaining a good copy of the bad data blocks using various data retention techniques (e.g., remote data recovery, using a snapshot, and using a local copy). As used herein, performing synchronous recovery means performing data recovery while serving the I/O that identified unrecoverable errors.

If the error was encountered as part of the file system I/O, still the error is first detected by the RAID system because the file system relies on the RAID system to service I/Os to the storage devices. So, effectively, the unrecoverable error is detected by the RAID system first. Since the RAID system is performing the I/O on behalf of the file system, RAID system returns the error to the file system. The file system, in turn, can return the error to the client or try to do error recovery synchronously to the I/O during which the unrecoverable error condition was identified. The steps to perform synchronous error recovery by the file system are similar to those performed by the module for opportunistic error recovery, as will be described below. If the file system is unable to correct the error, an error is returned to the client. In other implementations, a zeroed data block or a block with some pattern is returned to the client. In addition, the data container that includes the "bad" data block is marked as "corrupted".

It is important to note here the differences between existing error recovery schemes and the proposed novel techniques. As described earlier in the document, in RAID-1, the contents of each storage device in the array are identical to that of every other storage device in the array. If a data block in the RAID-1 sustains an error and a copy of the data block is not available in the array, RAID cannot recover the error condition and calls the file system to run a disruptive consistency check operation. Thus, immediate availability of a copy of a "bad" data block was essential to performing error recovery in RAID-1 implementation. The file system did not have the capability to perform any error recovery. It could only propagate the error to the client that initiated the I/O request.

Similarly, when unrecoverable error was encountered in RAID-4, RAID-5 and RAID-DP, RAID system would mask the error by writing some value to the data blocks, such as a "zero" value, and re-computing the parity. Since known mechanisms did not have capability to reliably track data blocks that encountered the error, RAID system would call the file system to run a disruptive consistency check operation.

The novel techniques described herein provide an efficient mechanism by which RAID system can keep track of the "bad" data blocks by parity-protecting the pseudo-bad indicator, thereby remembering the fact that a particular data block is bad in the event a storage device where the data block is stored is to fail and to be reconstructed. Furthermore, the novel techniques described herein allow the file system to invoke asynchronous error recovery by obtaining a copy of the "bad" data block either locally or remotely in contrast to existing error recovery techniques. Existing error recovery techniques do not enable the file system to do any recovery other than propagating the error to the client that issued the I/O.

Figure 7:
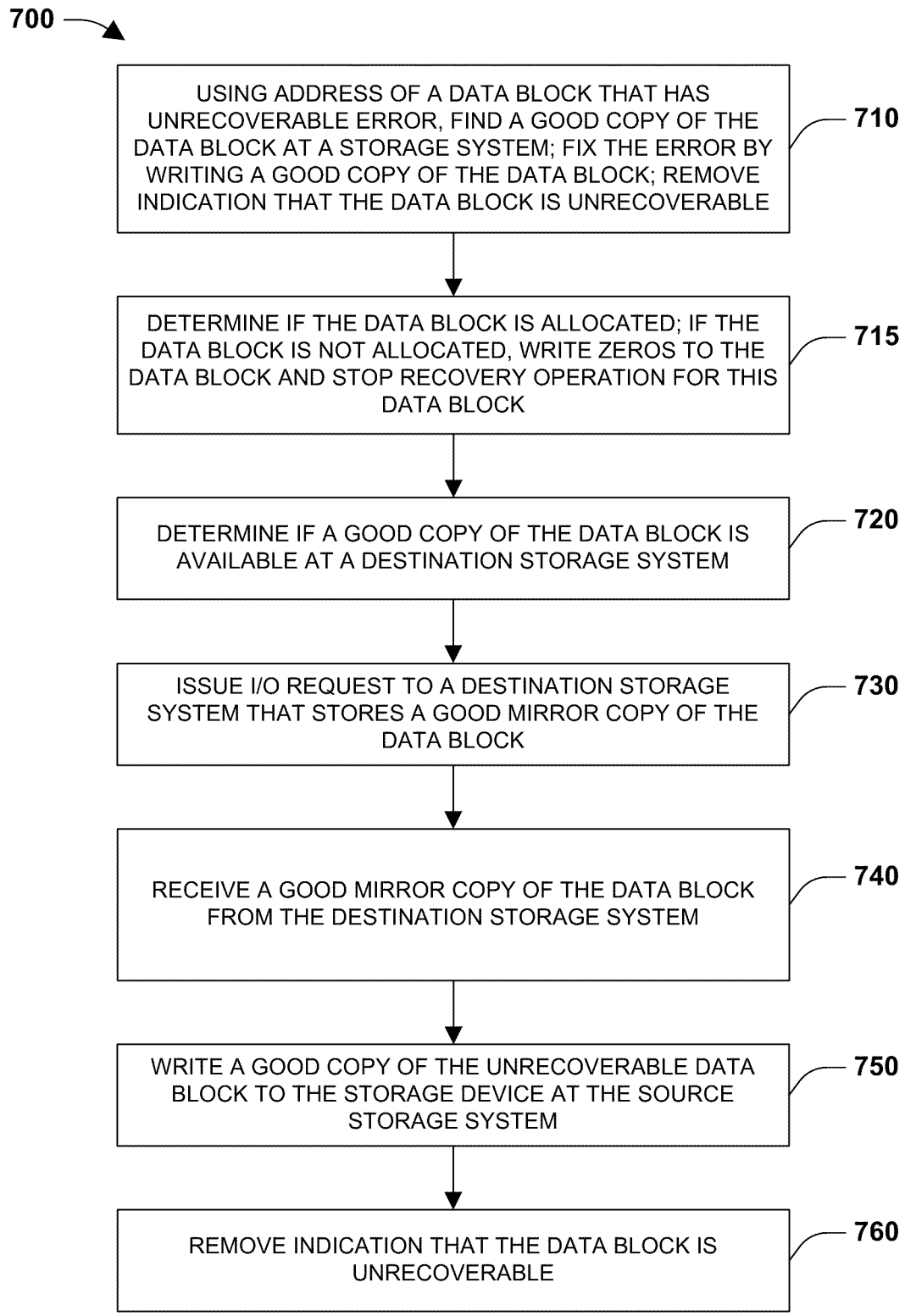
FIG. 7 is a flow diagram of a method for performing error correction according to embodiments of the present invention.

Referring now to FIG. 7, a flow diagram of a method for performing opportunistic error recovery is shown. The method is referred to as "opportunistic" error recovery because in some instances, when a copy of a data block is not available, an error will be returned to the entity that issued an I/O request, (such as a client or a file system, or RAID system).

Module 390 performs recovery of data blocks that sustained unrecoverable error condition according to the steps recited in FIG. 7. Those skilled in the art would understand that operations of module 390 can be triggered by pseudo-bad block management module 360 in response to encountering unrecoverable errors in the context of the I/O requests initiated by clients or in the context of I/O requests initiated by RAID system 340 as part of internal operations. Initially, in one embodiment, module 390 searches for a good cached copy of the "bad" data block, for example in the buffer cache 270. To that end, module 390 consults data structure 374 (shown in FIG. 3) that maintains information about copies of the data blocks stored on storage system 220. Module 390, in one example, uses PVBN and VVBN address of a "bad" data block to determine if a copy of the data block is stored locally, i.e., in the buffer cache 270 of storage system 220, in a snapshot, or remotely, such as at a destination storage system that maintains a mirror of the data stored at storage system 220.

If the good copy of the data block is cached in the buffer cache, in one implementation, module 390 reads the data block from the buffer cache and writes it in place of the "bad" data block at the same logical address. Alternatively, a cached copy of the data block can be written at a different address. In this case, the "bad" data block that sustained unrecoverable error is marked as unallocated in the block allocation data structure 370 (by, for example, by setting a bit). Further, the pseudo-bad indicator in the checksum area of the data block will be cleared to indicate that the data block is no longer "bad". It should be noted that if the "bad" data block is not an allocated data block, then the need to obtain a cached copy of the data block is eliminated. Instead, an easy identifiable pattern, such as "zeroes" can be written in place of the data block.

Another source for obtaining a copy of the data block locally at the storage system 220 is finding if the data block is stored in a snapshot. In one implementation, Flex Volume (i.e., a file system that resides within address space of an aggregate) maintains a list of snapshots of the data blocks, such as snapshot 0, snapshot 1, snapshot 2, etc. Each snapshot is also associated with a timestamp indicating when the snapshot was taken. Module 390 may obtain the oldest copy of the data block, such as snapshot 0, using its timestamp. Module 390 then writes the "good" copy of the "bad" data block in place of the "bad" data block at the same address. Alternatively, a cached copy of the data block can be written at a different address. In this case, the original "bad" data block that sustained unrecoverable error will be marked as unallocated in the block allocation data structure 370 (by, for example, setting a bit). Further, the pseudo-bad indicator in the checksum area of the data block is cleared to indicate that the data block is no longer "bad".

If at step 710, a local copy of the data block is not available, module 390 for opportunistic error recovery uses data structure 374 to determine if a copy of the data block is available remotely at a mirror destination storage system. Data structure may store mappings between VVBN of a source volume at the source storage system 220 and a VVBN of a destination volume at a destination storage system where a mirror copy of the data block can be stored.

Figure 8:
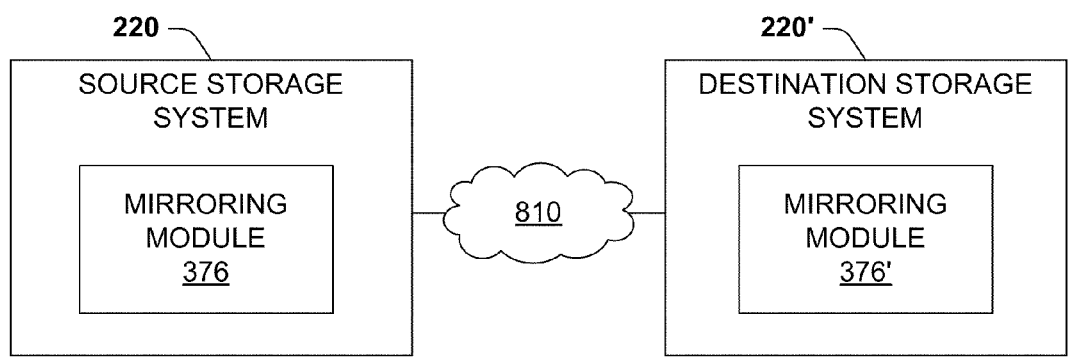
FIG. 8 is a block diagram of a source storage system and a destination storage system for storing mirrored copy of the data.

At this point, it is useful to briefly explain how the data is mirrored to the destination storage system and then recovered upon request. Referring now to FIG. 8, a block diagram of a source storage system (such as storage system 220 shown in FIG. 2) and a destination storage system 220' are shown. For purposes of this description, the source storage system 220 is a device that manages storage of one or more source volumes (not shown), each having an array of storage devices (e.g., devices 230 shown in FIG. 2). The destination storage system 220' also manages one or more destination volumes (not shown), which, in turn, comprise arrays of storage devices (not shown in FIG. 8). Those skilled in the art would understand that destination storage system 220' is a storage system similar to the source storage system 220. Both storage systems are connected via network 810, which can comprise a local or wide area network. As used herein, the term "source" can be broadly defined as a location from which data travels and the term "destination" can be defined as the location to which the data travels. As described herein, to improve reliability and facilitate disaster recovery in the event of a failure of the source storage system 220, its associated storage devices or some portion of the storage infrastructure are mirrored at the destination storage system 220'. The original dataset is also called a "source dataset" with respect to the minor. A dataset is a set of data. Examples of datasets include, e.g., a file system, a volume, a directory, or a data container.

The term "mirroring" refers to the process of creating a copy or a replica of a dataset. The minor at the destination storage system could have been created using several mechanisms, such as a SnapMirror® application provided by NetApp (shown as mirroring module 376 at the source storage system 220 and mirroring module 376' at the destination storage system 220'). Mirroring module 376 is responsible (on the source storage system) for identifying changes between a base snapshot (the most recent snapshot transferred successfully) and a current snapshot of the source file system and transferring the changes to the destination storage system over the network. The mirroring module 376' at the destination storage system 220' is responsible for updating a dataset at the destination storage system 220'.

Still with reference to flowchart in FIG. 7, which illustrates the steps for opportunistic error recovery, module 390 attempts to obtain a good mirror copy of the "bad" data block at the destination storage system 220'. To that end, at step 720, module 390 uses data structure 374 to obtain mappings between Local FlexVol ID and Destination FlexVol ID and Local VVBN and Destination VVBN of a data block which copy is sought. "Local FlexVol ID" is an identifier that specifies address of the volume where the "bad" data block resides at a storage system 220. Destination FlexVol ID is an identifier that specifies address of the volume where a good copy of the "bad" data block resides at a destination storage system 220'. "Local VVBN" is an address of a data block in the volume at a source storage system. "Destination VVBN", in turn, is an address of a data block in a volume at a destination storage system. At step 730, module 390 at a source storage system 220 issues an I/O request over network 810 to the destination storage system 220', using for example, protocol module 320. The I/O request includes, for example, Destination FlexVol ID and Destination VVBN. Mirroring module 376' receives the request, forwards the request to the file system (not shown) of the destination storage system 220' using the Destination VVBN of the data block. File system, in turn, passes a message structure including VVBN of a data block to the RAID system (not shown) at the destination storage system 220'. The file system maintains mappings from VVBN to PVBN address of a data block. The RAID system, in turn, maintains mappings between PVBN and DBN of the data block. The RAID system sends DBN to an appropriate driver (not shown) of a storage driver module at the destination storage system.

In one implementation, module 390 is responsible for determining if a good copy of the data block does not have an error and thus is not corrupted. For example, if a storage device where the good copy of the data block resides has a hardware failure, then the storage device reports the hardware error, such as a media error, to the storage driver module and the good copy of the data block cannot be read.

If the storage device did not return any error, then module 390 performs data corruption verification, by, for example, verifying the checksum stored within a data block. To this end, the storage driver module accesses the DBN from the specified storage device (such as a disk) and loads the requested data block(s). When data are written to a storage device, RAID system computes a checksum from the data and writes it to the storage device. During a data access request to a data block, RAID system recomputes the checksum and compares the recomputed checksum with the stored one. If the recomputed checksum and the stored one do not match, then the requested data block is corrupted and thus cannot be used to correct the unrecoverable error.

If the two checksums match, then RAID performs another tier of data verification, by comparing information provided by, e.g., a file system. Typically, when data are written to a storage device, the file system provides to RAID system a data container identifier (ID), PVBN of a data block, and inode number, which are stored within on a storage device. When a data block is read, the same information about the data block is provided by the file system. RAID system reads the information received from the file system (such information is a data container ID, PVBN, inode number) and compares the received information with the stored one. If the compared information matches, it indicates that the requested data block is not corrupted and the storage destination storage system 220' returns a good mirrored copy of the data block to the source storage system 220 over the network 810.

If the verification process fails, then an error will be returned by RAID indicating that the data block is corrupted. At step 740, if a good copy of the bad data blocks is available and is not corrupted, module 380 for managing unrecoverable errors at the source storage system 220 receives a good mirrored copy of the "bad" data block from the destination storage system 220'. Module 380 writes the good mirrored copy of the bad data block in place at the address of the bad data block that sustained unrecoverable error (step 750). Module 390 then removes the indication that the original data block is "bad", by for example, resetting the pseudo-bad indicator (step 760). Alternatively, module 380 writes the good mirrored copy of the data block at a different location. If written at a different location, the original "bad" data block is marked as unallocated at the block allocation data structure 370. The above-recited steps are performed asynchronously to the I/O that during which an unrecoverable error was detected, if the I/O request was initiated by RAID system 340. Alternatively, error recovery can be performed synchronously if the I/O request was initiated by the file system 310. The file system uses the above-recited steps to perform synchronous error recovery. If the file system 310 is able to obtain a good copy of the bad data block, then the file system would re-write a good copy of the data block to the same location or to a different location. The bad data block can be marked as unallocated in the block allocation data structure (e.g., 370). Thus, when RAID system later triggers asynchronous error recovery, there would be no errors left to fix. However, if the file system is unable to do a synchronous error recovery, then there is still scope for fixing the error asynchronously using the above-described mechanism. Similarly, the RAID system can also perform synchronous error recovery. If the RAID system is able to obtain a good copy of the bad data block, then the good copy of the data block is written to the location o the bad data block or rewritten to a new location.

Thus, embodiments described herein provide a novel technique for correcting unrecoverable errors (i.e., errors that cannot be reconstructed by the existing RAID construction algorithms) in a RAID array without requiring drastic recovery actions, such as a file system consistency check, which typically disrupts client access to the storage system and is unable to recover data blocks in the array that sustained the unrecoverable error.

Although embodiments described herein, for the purpose of explanation, have been described with reference to specific exemplary embodiments, it will be understood that the invention is not limited to the embodiments described. For example, embodiments described herein can be practiced on any storage device. A person of ordinary skill in the art would understand that the present invention can be practiced with modifications and alternations to those embodiments or can be practiced in other embodiments within the spirit and scope of the appended claims.

Moreover, the teachings of described herein can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The embodiments described herein can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, flash storage devices, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for correcting unrecoverable errors on storage devices connected to a storage system, the method comprising:
    identifying, by the storage system during a data access request to the storage devices, a data block having an unrecoverable error, the unrecoverable error cannot be corrected by an underlying RAID protection technique at the storage system;
    providing an indicator within a close proximity of the data block having the unrecoverable error that the data block is invalid, the indicator stored at a location so that when an I/O is issued to the data block having the unrecoverable error, the indicator is read as part of the same I/O;
    protecting the indicator by the underlying RAID protection technique; and
    recovering the data block having the unrecoverable error without initiating a consistency check operation in the storage system by obtaining a good copy of the data block having the unrecoverable error asynchronously to the data access request to the storage devices during which the data block having the unrecoverable error was identified.

2. The method of claim 1, wherein obtaining a good copy of the data block having the unrecoverable error asynchronously to the data access request further comprises obtaining the good copy of the data block after the data access request to the storage devices during which the unrecoverable error was identified.

3. The method of claim 1, wherein the good copy of the data block having the unrecoverable error is provided at a time after the data access request to the storage devices during which the unrecoverable errors was identified.

4. The method of claim 1, wherein obtaining a good copy of the data blocks having the unrecoverable error further comprises obtaining the good copy stored in a memory at the storage system.

5. The method of claim 1, wherein obtaining a good copy of the data block having the unrecoverable error further comprises obtaining the good copy of the data block remotely at a destination storage system storing mirror copies of the data blocks residing at the storage system, the destination system connected to the storage system over a network.

6. The method of claim 1, wherein recovering the data block having the unrecoverable error without initiating a consistency check operation in the storage system further comprises continuing servicing client data access requests by the storage system.

7. The method of claim 1, wherein recovering the data block having the unrecoverable errors further comprises writing the good copy of the data block in place of the data block having the unrecoverable error.

8. The method of claim 1, wherein recovering the data block having the unrecoverable error further comprises writing the good copy of the data block to a different location other than the location where the data block having the unrecoverable error is located and further comprising marking the data block as free at the storage system.

9. The method of claim 1, wherein providing an indicator within close proximity of the data block having the unrecoverable error further comprises setting a pseudo-bad indicator in a checksum area adjacent to the data block.

10. The method of claim 1, further comprising removing the indicator that the data block is invalid once the good copy of the data block is obtained.

11. The method of claim 1, the good copy comprising a mirrored version of the data block.

12. The method of claim 1, further comprising obtaining the good copy of the data block having the unrecoverable error synchronously to the data access request.

13. The method of claim 1, wherein obtaining the good copy of the data block having the unrecoverable error further comprises obtaining a snapshot copy of the data block.

14. The method of claim 1, wherein protecting the indicator by the underlying RAID protection technique further comprises computing a parity for the indicator.

15. The method of claim 1, wherein protecting the indicator by the underlying RAID protection technique further comprises mirroring the indicator and storing the indicator within a close proximity of a mirrored copy of the data block.

16. The method of claim 1, further comprising determining if a copy of the data block having an unrecoverable error is a good copy by:
    comparing a file system write signature stored within the copy of the data block and a received file system write signature from a file system upon reading the copy of the data block;
    if a match between the file system write signature and the received file system write signature is detected, using the copy of the data block to correct the unrecoverable error; and
    if a match between the file system write signature and the received file system write signature is not detected, not using the copy of the data block to correct the unrecoverable error.

17. The method of claim 1, further comprising:
    performing a checksum value verification to determine if a checksum value computed upon reading the good copy of the data block and a checksum value that has previously been computed for the data block match; and responsive to the two values not matching, determining that the good copy of the data block is bad and cannot be used to perform error recovery.

18. The method of claim 14, wherein computing the parity for the indicator further comprises:
   performing an exclusive OR (XOR) operation on the indicator to create a computed value; and
   writing the computed value within a close proximity of the data block that stores parity for data blocks in a stripe in the storage system.

19. The method of claim 1, further comprising generating a new value for each data block having an unrecoverable error by:
   responsive to an error being a media error or a missing block error, writing an identifiable pattern to the data blocks having an indicator set and updating data integrity information to indicate that the data integrity information cannot be used to verify data in the data block;
   responsive to an error being a checksum error, filling the data block with original data read from a storage device where the data block resides and updating data integrity information to indicate that the data integrity information cannot be used to verify data in the data block; and
   responsive to an error being a lost write error, filling the data block with original data.

20. The method of claim 1, wherein the good copy of the data block includes data identical to original data that was written to the data block prior to encountering the unrecoverable error.

21. The method of claim 1, wherein the good copy of the data block is not marked with an indicator indicating that the data block is invalid.

22. A method for correcting unrecoverable errors in a storage array connected to a storage system for storing data, the method comprising:
   performing a data access request to the storage array;
   identifying, by a storage module, a data block having an error;
   initiating, by the storage module, a recovery operation to recover the data block that has the error;
   determining, by the storage module, that the storage array has an unrecoverable error, wherein unrecoverable errors are errors that cannot be corrected by an underlying RAID protection technique of the storage module;
   obtaining a good copy of the data block having the unrecoverable error asynchronously to the data access request to the storage array during which the data block having the unrecoverable error was identified, the obtaining comprising:
      comparing a file system write signature stored within a copy of the data block and a received file system write signature from a file system upon reading the copy of the data block;
      if a match is detected, then using the copy of the data block as the good copy to correct the unrecoverable error; and
      if a match is not detected, then not using the copy of the data block as the good copy to correct the unrecoverable error; and
   writing the good copy of the data block to correct the error in the storage array.

23. The method of claim 22, wherein the good copy of the data block includes data identical to original data that was written to the data block prior to encountering the unrecoverable error.

24. The method of claim 22, wherein obtaining the good copy of the data block having the unrecoverable error asynchronously to the data access request to the storage array further comprises obtaining the good copy of the data block after the data access request to the storage array, during which the data block having the unrecoverable error was identified.

25. A method for correcting unrecoverable errors in a storage array connected to a storage system for storing data, the method comprising:
   identifying, by a RAID system during a data access request, a data block having an unrecoverable error that cannot be corrected by an underlying RAID technique at the storage system;
   providing an indicator within close proximity of the data block having the unrecoverable error that the data block has an error;
   protecting the indicator by the underlying RAID technique, thereby reliably maintaining information about data blocks having unrecoverable errors;
   obtaining a good copy of the data block having the unrecoverable error; and
   generating a new value for the data block, comprising:
      if the error is a media error or a missing block error, then writing an identifiable pattern to the data block and updating data integrity information to indicate that the data integrity information cannot be used to verify data in the data block;
      if the error is a checksum error, then filling the data block with original data read from a storage device where the data block resides and updating data integrity information to indicate that the data integrity information cannot be used to verify data in the data block; and
      if the error is a lost write error, then filling the data block with original data.

26. The method of claim 25, wherein protecting the indicator by the underlying RAID technique further comprises computing a parity value for the indicator.

27. The method of claim 25, wherein protecting the indicator by the underlying RAID technique further comprises mirroring the indicator.

28. A storage system for correcting unrecoverable errors in a storage array, the system comprising:
   a storage module that maintains a data protection mechanism, the storage module configured to identify during a data access request, a data block having an unrecoverable error condition that cannot be corrected by the data protection mechanism;
   a pseudo-bad block management module configured to set an indicator within a close proximity to the data block having the unrecoverable error condition and to protect the indicator by the data protection mechanism;
   a module for opportunistic error recovery configured to perform error recovery to identify a good copy of the data block having the unrecoverable error asynchronously to the data access request during which the unrecoverable error was encountered, and to recover the data block having the unrecoverable error;
   a first mirroring module executed at the storage system, the first mirroring module configured to send copies of data blocks to a destination storage system connected to the storage system via a network; and
   a second mirroring module executed at the destination storage system configured to store copies of the data maintained at the storage system, the second mirroring module configured to provide a copy of the data blocks upon request by the first mirroring module for opportunistic error recovery, at least some of at least one of the storage module, the pseudo-bad block management module, the module for opportunistic error recovery, the first mirroring module, and the second mirroring module implemented at least in part via a processor of the storage system.

29. The system of claim 28, further comprising a data structure for storing mappings between data blocks at the storage system and copies of the data blocks maintained at the destination storage system connected to the storage system over a network.

30. The system of claim 28, further comprising a buffer cache memory for storing copies of the data blocks locally at the storage system.

31. The system of claim 28, the data protection mechanism comprising an underlying RAID technique.

\* \* \* \* \*